United States Patent
Beyer et al.

(10) Patent No.: US 6,833,643 B2
(45) Date of Patent: Dec. 21, 2004

(54) MAGNETIC BEARING WITH DAMPING

(75) Inventors: Christian Beyer, Köln (DE); Heinrich Engländer, Linnich (DE); Josef Hodapp, Köln-Sülz (DE)

(73) Assignee: Leybold Vakuum GmbH, Köln (DE)

( * ) Notice: Subject to any disclaimer, the term of this patent is extended or adjusted under 35 U.S.C. 154(b) by 0 days.

(21) Appl. No.: 10/275,459

(22) PCT Filed: Apr. 11, 2001

(86) PCT No.: PCT/EP01/04166

§ 371 (c)(1),
(2), (4) Date: Apr. 21, 2003

(87) PCT Pub. No.: WO01/86151

PCT Pub. Date: Nov. 15, 2001

(65) Prior Publication Data

US 2003/0155830 A1 Aug. 21, 2003

(30) Foreign Application Priority Data

May 6, 2000 (DE) .................... 100 22 0614

(51) Int. Cl.⁷ ............................................. H02K 7/09
(52) U.S. Cl. ......................................... 310/90.5
(58) Field of Search ............................. 310/90.5, 90

(56) References Cited

U.S. PATENT DOCUMENTS

| | | | |
|---|---|---|---|
| 3,958,842 A | 5/1976 | Telle | 308/10 |
| 4,471,331 A | 9/1984 | Wyatt | 335/285 |
| 4,541,772 A * | 9/1985 | Becker | 415/90 |
| 5,059,092 A | 10/1991 | Kabelitz et al. | 415/90 |
| 5,196,748 A * | 3/1993 | Rigney | 310/90.5 |
| 5,341,059 A | 8/1994 | Fukuyama et al. | 310/90.5 |
| 5,686,772 A * | 11/1997 | Delamare et al. | 310/90.5 |
| 5,710,469 A | 1/1998 | Ries | 310/90.5 |

FOREIGN PATENT DOCUMENTS

| | | |
|---|---|---|
| DE | 32 39 328 | 4/1984 |
| DE | 42 32 869 | 4/1993 |
| DE | 44 36 831 | 6/1995 |
| DE | 19727 550 | 2/1998 |
| EP | 0 413 851 | 2/1991 |
| EP | 0 445 690 | 9/1991 |
| EP | 0 467 341 | 1/1992 |
| EP | 0 470 637 | 2/1992 |
| JP | 03255220 | 11/1991 |

* cited by examiner

*Primary Examiner*—Thanh Lam
(74) *Attorney, Agent, or Firm*—Fay, Sharpe, Fagan, Minnich & McKee, LLP

(57) ABSTRACT

A magnetic bearing for rapidly rotating machines (1), in particular, for turbo compressors, drag vacuum pumps, or similar, includes two bearings (3, 4), each with a stator magnetic-ring set (5, 7) and a rotor magnetic-ring set (6, 8). Movement of the rotor is damped by magnetic-ring sets (5, 6; 7, 8) arranged concentrically to each other. The stator magnetic-ring set (5 or 7) is arranged externally and the rotor magnetic-ring set (6 or 8) is arranged internally. Non-magnetic elements with good electrical conducting properties (32, 54, 55) are connected to the outer circumference surfaces of at least one part of the magnetic ring of each of the stator-side magnetic-ring sets (5, 7).

18 Claims, 6 Drawing Sheets

MAGNETIC BEARING WITH DAMPING

BACKGROUND OF THE INVENTION

The present invention relates to a magnetic bearing for rapidly rotating machines, in particular, for turbo compressors, drag vacuum pumps, or similar, comprising two bearings, each with a stator magnetic-ring set and a rotor magnetic-ring set and means for damping the rotor movement.

U.S. Pat. No. 5,059,092 shows a magnetic bearing of this kind consisting of two bearings. The first, passively designed bearing has engaging stator and rotor magnetic rings. The second, actively designed bearing is equipped with two rotor magnetic rings spaced axially apart. In the ring chamber formed by these rings, a ring disk made of non-magnetizable material with good electrical conducting properties, effects the desired damping, in particular for the radially directed movements of the rotor. This damping is based on the induction of eddy currents by changing the magnetic flux in the electrically well conducting material. The eddy currents generated by the disk by perpendicularly penetrating magnetic fields generate electromagnetic counteracting forces opposing the radial deflections of the rotor system, thereby damping these movements.

One disadvantage of the magnetic bearing of U.S. Pat. No. 5,059,092 is that both the magnetic rings of the passive bearing as well as the magnetic rings and the ring disk located in between, engage. Thus, assembly is complicated. Moreover, changes in the length of the rotor which occur due to temperature loads give rise to bearing problems. Moreover, damping is restricted to the location of the active bearing, meaning that the counteracting forces effecting the damping action are present only locally.

It is the task of the present invention to create a magnetic bearing having the characteristics detailed above, in which the damping action is not restricted to one of the two bearings, and in addition to render manufacture and assembly more simple.

SUMMARY OF THE INVENTION

In that the damping means can be assigned to each of the magnetic rings, preferably assigned at least to a part of the magnetic rings of the magnetic-ring sets each on the stator side, counteracting forces can be generated in both magnetic bearings damping the rotor movement, i.e. not only in the actively controlled bearing. Engaging of rings on the stator and the rotor sides is not required.

One advantage is that, compared to the prior art, manufacture and assembly of the bearings is more simple.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

drawing FIGS. 1 and 2 a schematic representation of machines with rotors which are each supported by a magnetic bearing designed in accordance with the present invention, drawing FIG. 3 a turbomolecular/molecular vacuum pump equipped with a bearing in accordance with the present invention, drawing FIGS. 4 to 7 partial sectional views through magnetic bearings in accordance with the present invention with differently designed means for axial control and drawing FIGS. 8 to 10 examples for embodiments of the magnetic bearings with damping means.

DETAILED DESCRIPTION OF THE PREFERRED EMBODIMENTS

Figure 1:
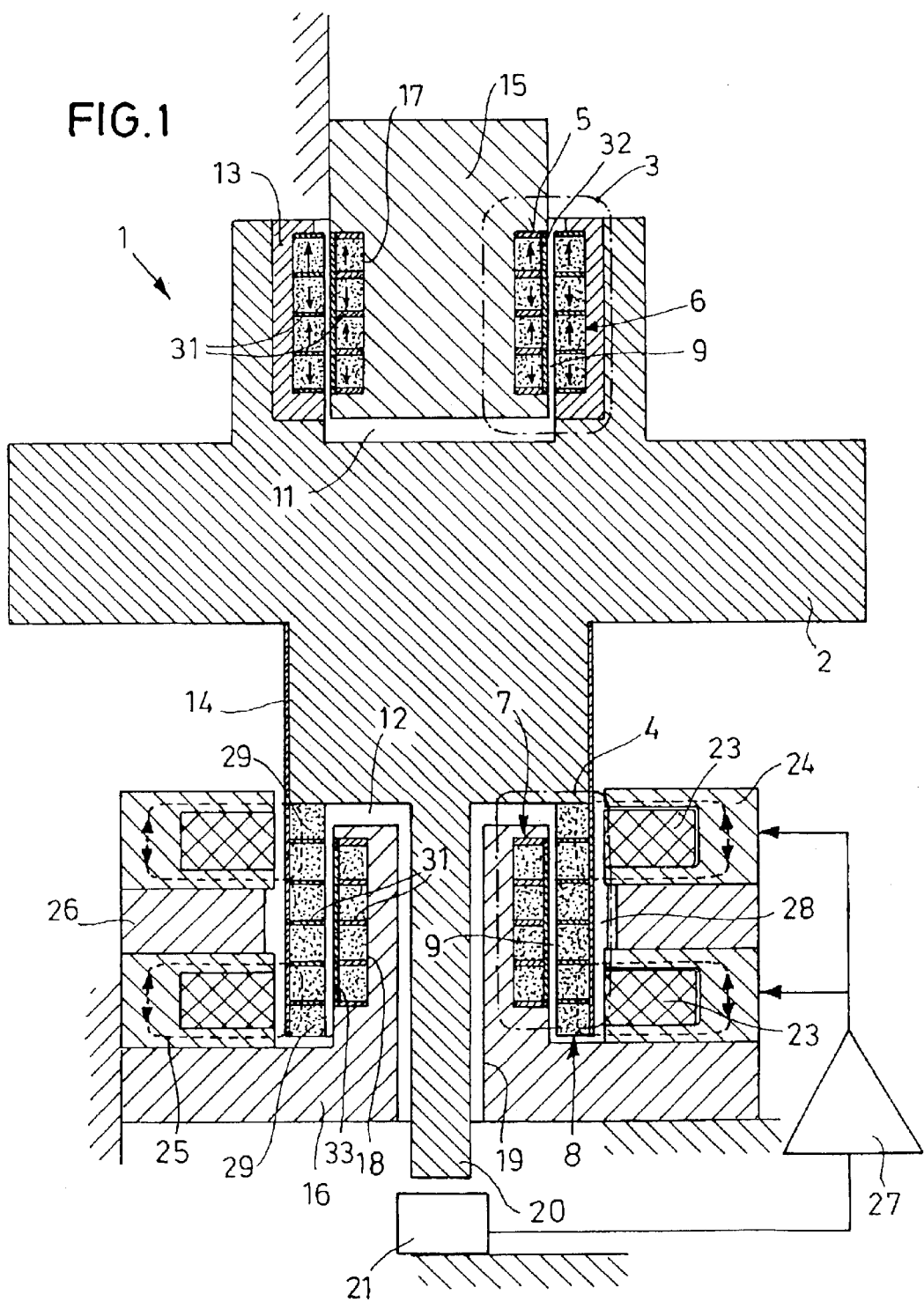
Figure 2:
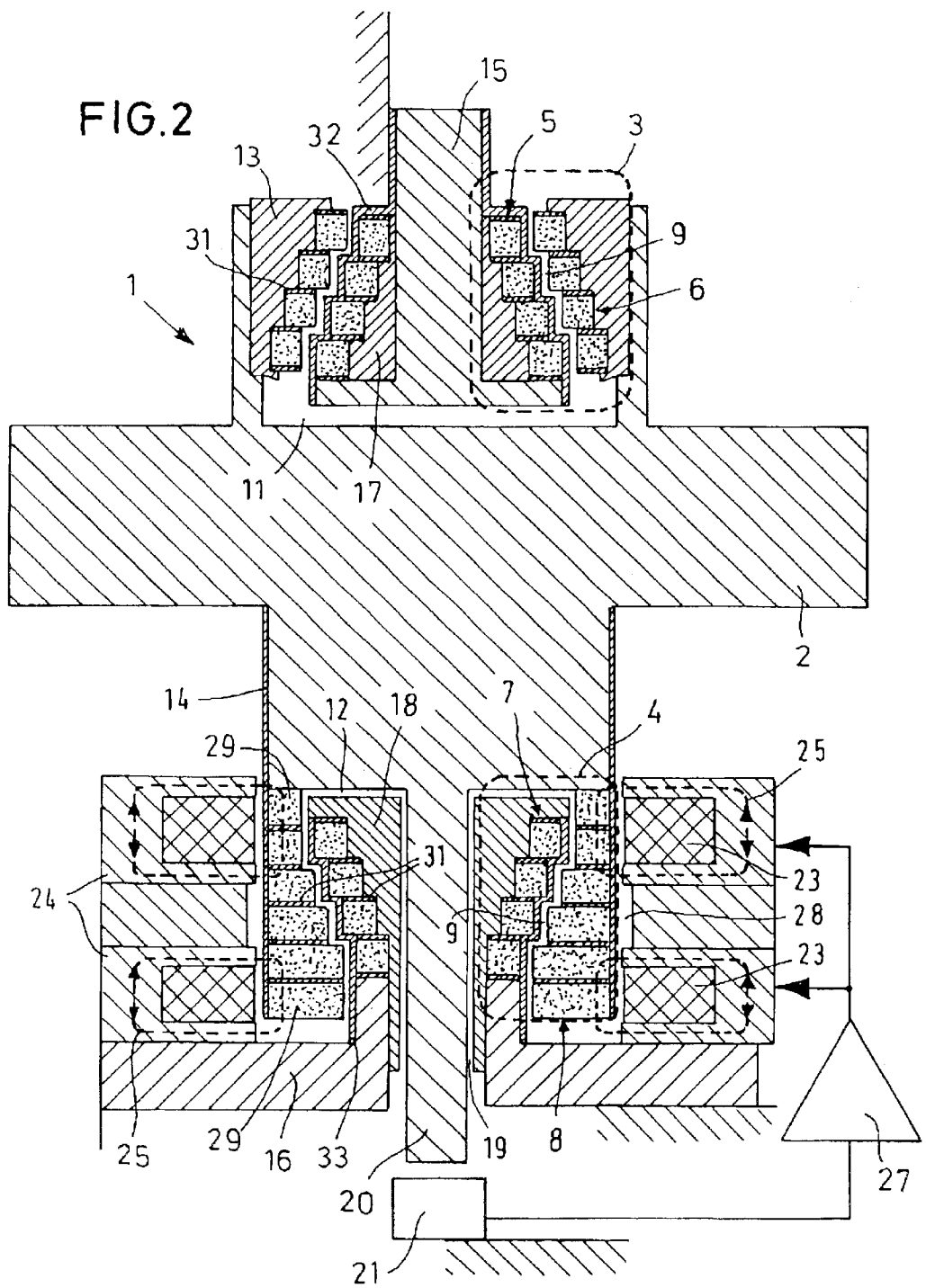

In the machines depicted schematically in drawing FIGS. 1 and 2, the rotating system 2 is suspended in two magnetic bearings 3, 4. Each magnetic bearing 3, 4 consists of two magnetic-ring sets 5, 6 (bearing 3) and 7, 8 (bearing 4) respectively. The inner ring set 5, 7 in each instance is mounted firmly, the outer ring sets 6, 8 which in each instance encompass the respective inner ring set concentrically and without making contact (slot 9) are components of the rotating system 2. The design is in all rotationally symmetric. A drive motor is not depicted.

The rotating system 2 is equipped at both face sides with central recesses 11, 12. The walls of these recesses form the receptacles 13, 14 for the rotating magnetic-ring sets 6, 8. Receptacle 14 is a pipe-shaped reinforcement made of non-magnetizable material, carbon fibre reinforced plastic, for example, which is fitted preferably by means of a press-fit seat at the rotating system 2. A section of the reinforcement 14 encompassing the recess 12 carries on its inside the magnetic-ring set 8.

Fixed carriers 15, 16 with receptacles 17, 18 for the fixed magnetic-ring sets 5, 7 project into the recesses 11, 12 in such a manner that the outer ring sets 6, 8 concentrically encompass the inner sets 5, 6. In the drawing figures each of the lower carriers 16 have a central bore 19 for a shaft end 20 of the rotating system 2, the face side of said shaft end being assigned to an axial sensor 21.

The axial sensor 21 is part of the means for axially controlling the magnetic bearing 4. One or several coils 23 each with an U-shaped yoke 24 open in the direction of the ring set 8, generate the magnetic fields indicated by the dashed lines and arrows 25. In drawing FIGS. 1 and 2 in each instance two coils 23 are provided encompassing the ring set 8. Their yoke components 24 are separated by a spacing disk 26 made of non-ferrite material.

A controller 27 serves the purpose of controlling the coils resp. the magnetic fields generated by the coils 23 depending on the signal output by the sensor 21. In the slot 28 located in each instance between the outer rotating rings sets 6, 8 and the coils 23, respectively the face side of the limbs of the yoke components 24, the magnetic forces serving the purpose of axial control become effective.

The ring sets 5 to 8 consist each of rings magnetized in the axial direction arranged with changing poles (as indicated by way of an example for bearing 3 in accordance with drawing FIG. 1) so that the ring sets 5, 6 resp. 7, 8 of the magnetic bearings 3, 4 repel each other. Preferably, so many outer and inner pairs of rings are provided that each of the magnetic-ring sets has at both its ends the same polarity. In the solution in accordance with drawing FIG. 1 the ring sets 5, 6 resp. 7, 8 each form two cylinders arranged concentrically with respect to each other. The dimensions of the magnetic-ring sets 5, 7 resp, 6, 8 are preferably identical in each instance. In the solution in accordance with drawing FIG. 2 the diameters of the circumferential surfaces of the rings of both ring sets 5, 6 resp. 7, 8 of the bearings 3, 4 facing each other change in distinct steps (in the same direction), so that also the slot 9 is step-shaped. Also the slot 28 in bearing 4 may (deviating from what is depicted in drawing FIG. 2) also be step-shaped.

In the upper bearing 3 the cross section of the rotating magnet can be maintained smaller compared to bearing 4. This saves costs for the magnetic material.

In bearing 4 it is required that the slot 28 between the pole surfaces of the yoke components and the magnets, which are held in place throughout the constant inside diameter of the carbon fibre reinforced plastic tube, be kept small so that the axial bearing can be effective on the magnets.

The rings of the magnetic-ring sets 5 to 8 are held firmly in place in their receptacles 13, 14, 17, 18. Annular spacing discs 31 made of non-ferric materials rest flush against the two face sides of each magnet ring so that the magnetic forces become effective preferably in the slots 9 and 28 respectively. If the material of the annular spacing discs 31 has in addition good electrical conducting properties (copper for example) damping of the rotor movements is already attained by this. However, the damping means will be particularly effective when they are related to the outer circumferential surfaces of the magnet rings of the magnet ring sets 5, 7 on the side of the stator. In the embodiment in accordance with drawing FIG. 1 these damping means are formed by a sleeve 32, 33 respectively made of a material with good electrical conducting properties, said sleeves encompassing the magnetic-ring sets 5, 7.

Moreover, the sleeves have the effect that they encapsulate the magnetic rings of magnetic-ring sets 5, 7. Thus the magnetic materials are protected against aggressive gases (for example, hydrogen in drag pumps). As an example, stepped sleeves 32, 33 for the in each instance fixed ring sets 5, 7 are depicted in drawing FIG. 2. At the side of the ring sets they are joined to the related receptacles in a gas-tight manner, welded, for example. Also the rotating magnetic-ring sets 6, 8 may be encapsulated in a similar manner.

Preferably the inner and outer rings of the ring sets 5, 6 resp. 7, 8 are arranged in pairs. To the end of improving axial control it may be expedient to add to the outer rotating ring set 8 of the axially active magnetic bearing 4, further rings. Variants of this kind are depicted in drawing FIGS. 1 and 2. The ring set 8 has two more rings compared to ring set 7. The two outer rings, designated as 29, have been added to the set 8. These may be soft ferric rings; preferably, however, two further magnetic rings are added.

Figure 3:
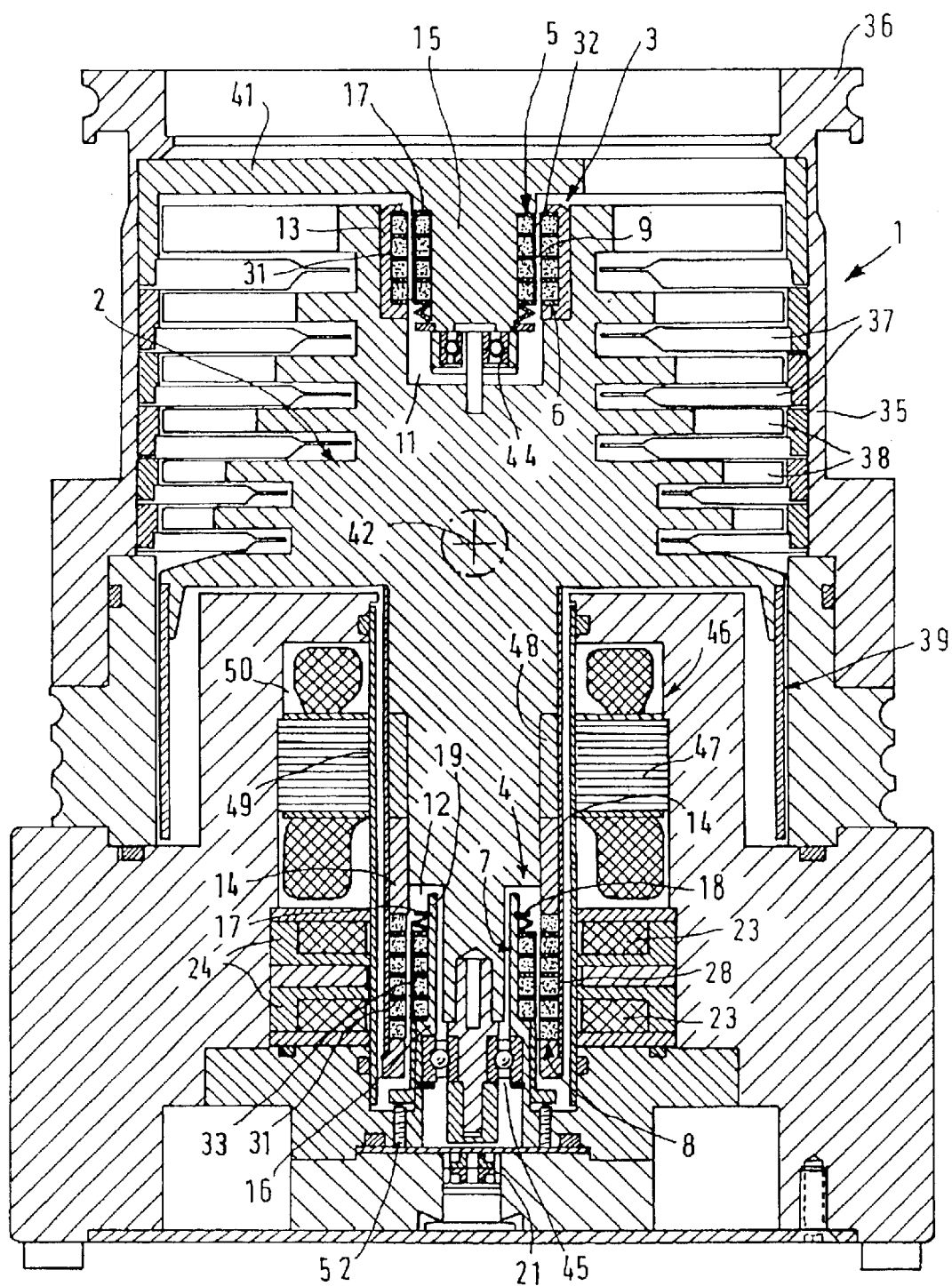
Figure 4:
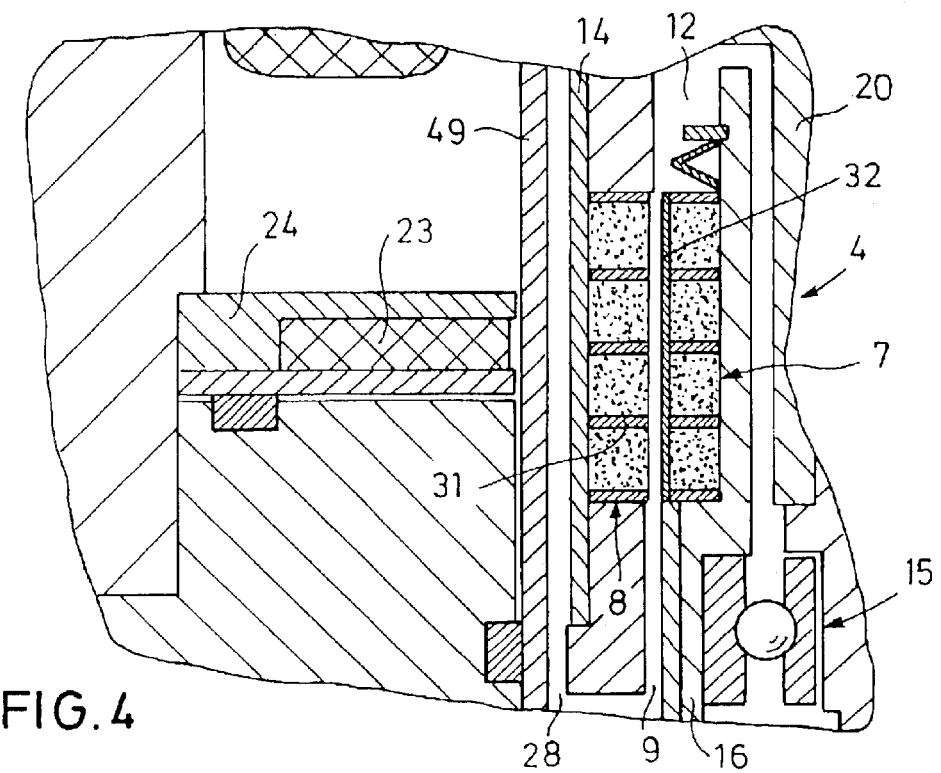
Figure 5:
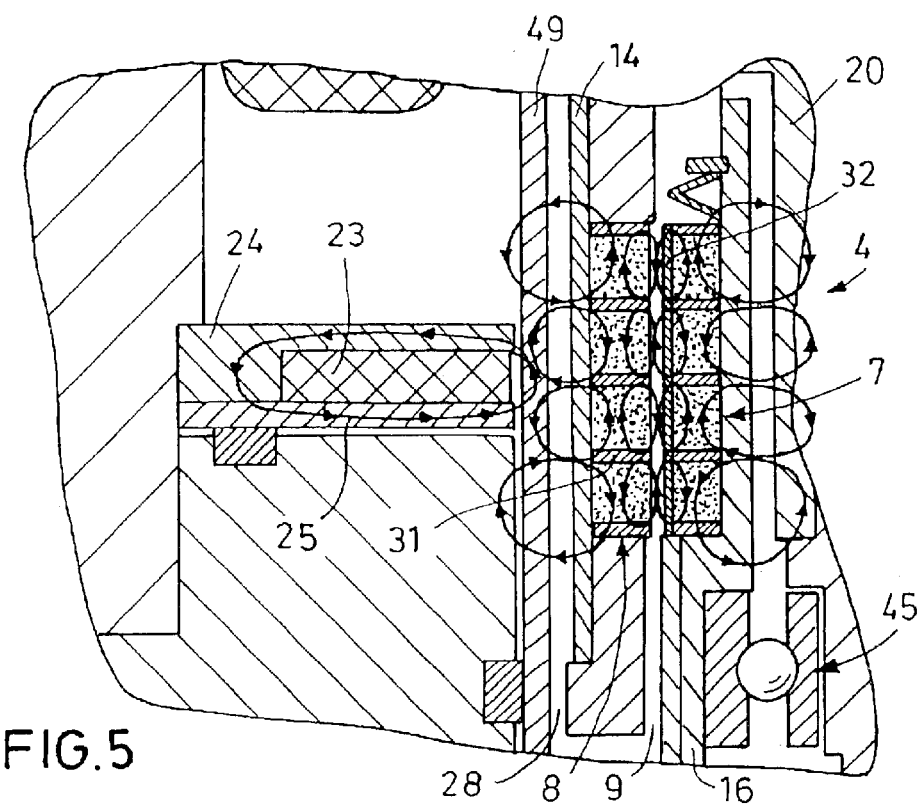
Figure 6:
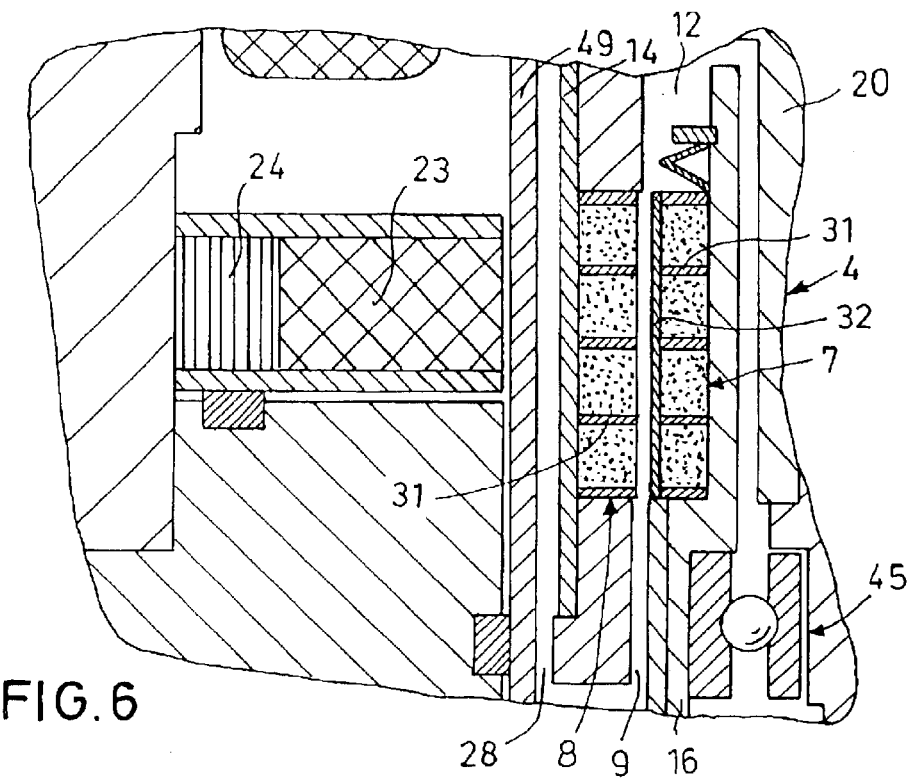

In the machine 1, a turbomolecular/molecular pump depicted in drawing FIG. 3, stator blades 37 are fitted in the casing 35 with the connecting flange 36. The magnetically suspended rotor 2 carries rotor blades 38 revolving between the stator blades 37, said rotor blades providing the pumping action for the gases. Pump I is a compound pump. The section equipped with blades is followed by a molecular pumping section 39.

The rotor 2 is suspended in both magnetic bearings 3 and 4. The magnetic bearing 3 is located at the high-vacuum side. The carrier 15 of the fixed magnetic-ring set 5 with its receptacle 17 is part of a bearing star 41.

The magnetic bearing 4 is located at the fore-vacuum side of the pump 1. Both bearings have approximately the same stiffness. The centre of gravity of the rotating system 2 is designated as 42.

The pump 1 is equipped with emergency bearings or touchdown bearings 44, 45. The touchdown bearing 44 at the high-vacuum side is located in a recess within the rotor 11. The touchdown 45 bearing at the fore-vacuum side is located under the magnetic bearing 4 between shaft end 20 and the fixed carrier 16.

As the drive motor 46, a high-frequency motor with stator 47 and armature 48 is provided. On the side of the stator there is furthermore provided a can 49 which seals off the stator chamber 50 against the fore-vacuum side in a vacuum-tight manner. The can 49 penetrates the slot 28 between the coils 23 with their yoke components 24 and the rotating magnetic-ring set 8. Said can is therefore expediently made of a non-magnetizable and electrically not well conducting material, carbon fibre reinforced plastic, for example.

At the side of the rotor the already detailed pipe-shaped reinforcement 14 is provided. It not only reinforces the ring set 8 but also the motor's armature 48.

In order to compensate for tolerances, bearing 4 is adjustable via adjustment screws 52 on which the carrier 16 for the fixed ring set 7 rests. Expediently the adjustment is performed such that the rotating system is located axially in the unstable operating point. Axial control can be effected with minimum energy requirements about this operating point.

Drawing FIGS. 4 to 7 depict different embodiments for the active magnetic bearing 4. In the solution in accordance with drawing FIGS. 4 (without magnetic field lines) and 5 (with magnetic field lines) each four magnetic rings form the rings sets 7 and 8. Only one coil 23 with its U-shaped yoke 24 is provided. The distance between the face sides of the U-limbs of yoke 24 corresponds approximately to the axial dimension of one magnetic ring of ring set 8. For the purpose of attaining an optimum interaction of the magnetic forces, the face sides of the U-limbs are located at the level of the centres of two neighbouring magnetic rings of ring set 8, in the embodiment depicted at the level of the centres of the two middle magnetic rings.

Figure 7:
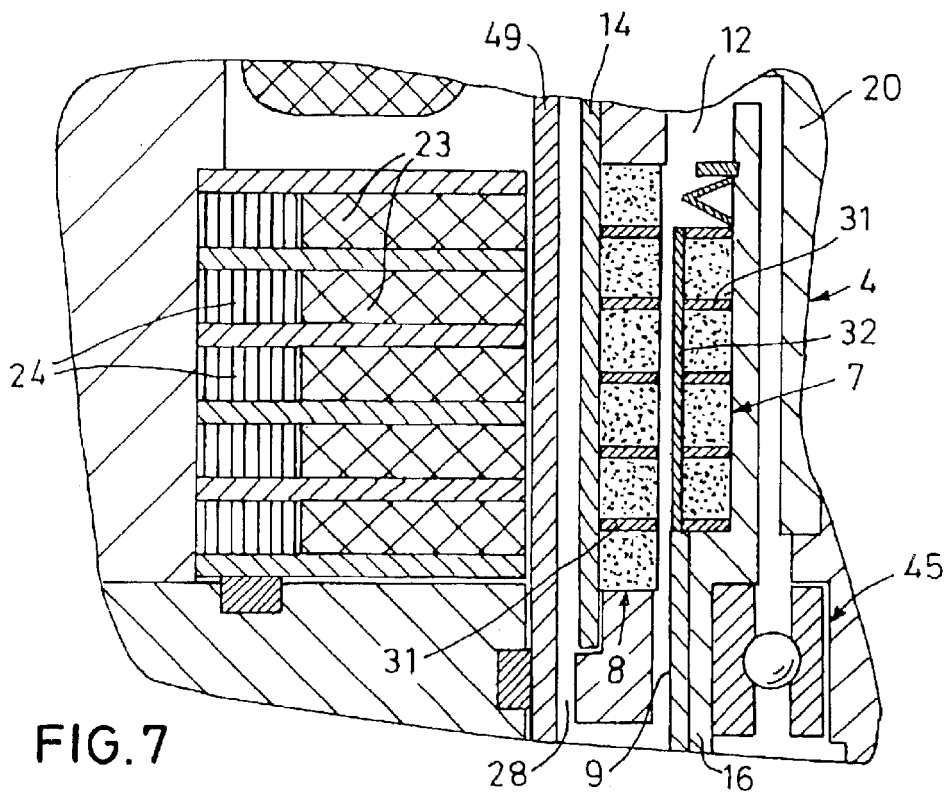

In the embodiment in accordance with drawing 6, there is also only provided one coil 23 with its yoke 24. The distance of the face sides of the limbs of the U-shaped yoke 24 facing the rings of the ring set 8 corresponds approximately to twice the axial dimension of a magnetic ring. Drawing FIG. 7 depicts a solution with five coils 23 and yokes 24. The ring set 8 has six magnetic rings. The face sides of the, in total six yoke limbs, are located approximately at the level of the centres of the magnetic rings.

Between each of the rings of the magnetic-ring sets 7, 8 there are located—as already detailed—annular spacing disks 31, which depending on the material have an influence on the formation of the magnetic field lines and/or the damping effect.

Figure 8:
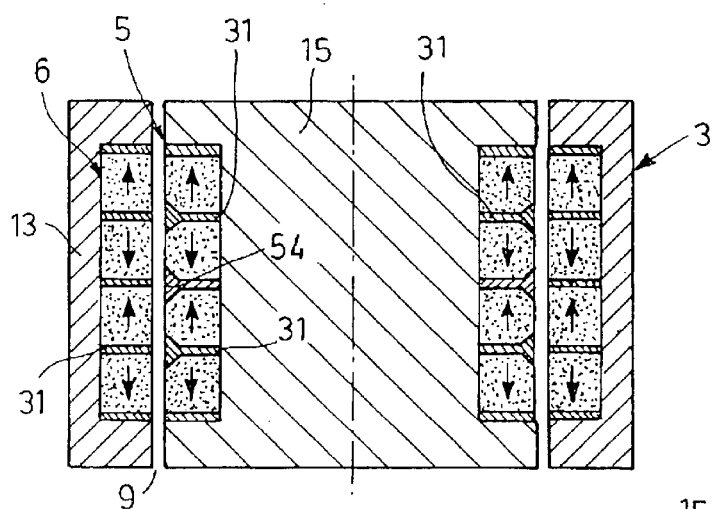

Expedient designs for the annular spacing disks 31, preferably for attaining a damping effect as well as supplementing the coatings of the magnetic rings are explained with reference to the embodiments of bearing 3 depicted in the drawing FIGS. 8 to 10.

If the material for the annular spacing disks 31 consists of a material with good electrical conducting properties expedient for attaining a damping effect, then it may be expedient for the purpose of improving the damping effect to reinforce the circumferences of the annular spacing disks 31 at the point where the magnetic field enters into the slot 9, for example increasing continuously outwards, and to adapt the shape of the magnetic rings to such circumferences. This embodiment is depicted in drawing FIG. 8. The reinforced circumference of the middle annular spacing disk 31 close to the slot is designated as 54. In that the magnetic fields pass through more conducting material, the counterforces generated by the eddy currents and providing the damping effect, increase.

Figure 9:
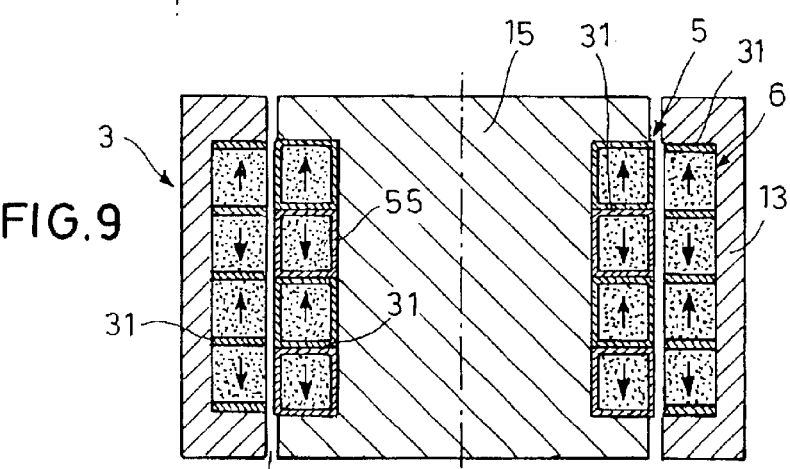
Figure 10:
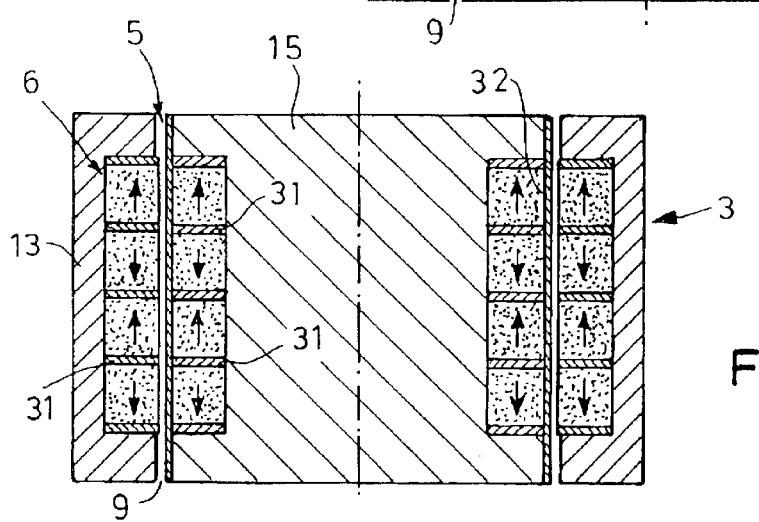

In the embodiment in accordance with drawing FIG. 9, for example, the magnetic rings of ring set 5 are coated (coating 55) on all sides. At the side they have the function of spacing disks 31, so that when of sufficient thickness of the coating 55 and suitably selected materials, said spacing disks will influence the magnetic field lines and/or have a damping effect. In addition it is achieved that the magnetic rings are protected against aggressive gases. Such protection may also be attained in that a sleeve 32 is provided, be it step-shaped as already detailed with reference to drawing FIG. 2, or cylindrical as depicted in drawing FIG. 10 (ring set 5), for example.

The annular spacing disks 31 (resp. coating 55) of the magnetic rings need(s) to be sufficiently thick to fulfil their/its purpose, particularly since also the desired stiffness of the bearing depends on the thickness of the spacing disks. In medium size drag pumps a thickness in the range from 0.25 to 1 mm has been found to be practical.

Moreover, the employment of spirally wound foil coils 23 has been found to be expedient since their space requirement is relatively small.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A rapidly rotating machine, in particular a turbo compressor, drag vacuum pump, or similar, comprising:
    a rotating system;
    two radially passive bearings, each with a stator magnetic-ring set and a rotor magnetic-ring set;
    the stator and rotor magnetic-ring sets being arranged concentrically to each other but not engaging;
    the stator magnetic-ring sets being arranged internally and the rotor magnetic-ring sets being arranged externally;
    a damping means for damping rotor movement, the damping means being made from a non-magnetizable material with good electrical conducting properties, located in the magnetic field of at least one of the magnetic bearings, the damping means connected to outer circumference surfaces of at least one part of the magnetic rings of at least one of the stator magnetic-ring sets;
    one of the two radially passive magnetic bearing being designed additionally as an axially active magnetic bearing, including:
        at least one coil and pole components, encompassing at least one of the rotor magnetic-rings of at least one of the rotor magnetic-ring sets, and
        an axial position sensor, controlling a magnetic field generated by the at least one coil.

2. The rotating machine in accordance with claim 1, wherein the damping means includes:
    annular spacing disks which are arranged between the magnetic rings, circumferences of the annular spacing disks being reinforced.

3. The rotating machine in accordance with claim 1, wherein the damping means includes:
    sleeves which encompass outer circumferential areas of the stator magnetic-ring sets.

4. The rotating machine in accordance with claim 1, wherein the magnetic rings are encapsulated, the encapsulation functioning as the damping means.

5. The rotating machine in accordance with claim 1, wherein the rotor magnetic-ring sets are equipped with damping means.

6. The rotating machine in accordance with claim 1, wherein the rotor and stator magnetic-ring sets have different numbers of the magnetic rings.

7. A magnetic bearing for rapidly rotating machines comprising:
    two bearings, each with a stator magnetic-ring set and a rotor magnetic-ring set, the stator and rotor magnetic-ring sets being arranged concentrically to each other, a number of magnetic rings of the rotor magnetic-ring sets being greater than a number of magnetic rings of the stator magnetic-ring sets; and,
    a damping means for damping rotor movement connected to outer circumference surfaces of at least one part of each magnetic ring of each of the stator magnetic-ring sets and being made from a non-magnetic material with good electrical conducting properties.

8. The rotating machine in accordance with claim 1, wherein diameters of circumferential surfaces of the magnetic rings of at least one pair of the rotor and stator magnetic-ring sets change in steps.

9. A drag pump with a rotor suspended with a rotating machine in accordance with claim 1.

10. The drag pump in accordance with claim 9, wherein the magnetic-ring sets are affixed in receptacles, the receptacle for the magnetic rings of one of the rotor magnetic-ring sets being a pipe-shaped, cylindrical reinforcement which has a first section affixed to the rotor and has a second section that carries the magnetic rings of the rotor magnetic-ring set.

11. The drag pump in accordance with claim 10, further including a reinforcement encompassing an armature of a drive motor.

12. The drag pump in accordance with claim 9, further including:
    centrally arranged carriers for the stator magnetic-ring sets one of the carriers being equipped with a central bore, a shaft end of the rotor being disposed in the central bore; and
    an axial sensor disposed adjacent to an unoccupied face side of the shaft end.

13. The drag pump in accordance with claim 12, wherein one of the carriers is axially adjustable.

14. The drag pump in accordance with claim 10, further including:
    a drive motor with a can, the can penetrating a slot in one of the magnetic bearings.

15. The drag pump in accordance with claim 9, wherein the magnetic bearing located at a high-vacuum side is a passive bearing and the magnetic bearing located at a fore-vacuum side is an axially active bearing.

16. A magnetic bearing comprising:
    a passive rotor magnetic ring set including a plurality of magnetic rings mountable to a rotor; and
    a passive stator magnetic ring set including a plurality of magnetic rings able to mount a stator radially adjacent and spaced from the rotor magnetic ring set, and at least one non-ferrous, electrically conductive ring extending along a circumferential face of the passive stator magnetic ring set facing the passive rotor magnetic ring set;
    an active stator magnetic ring disposed radially adjacent and spaced from the passive rotor magnetic ring set, the active stator magnetic ring generating a magnetic field that is actively controlled in accordance with axial displacement between the rotor ring set and the active stator magnetic ring to maintain axial alignment of the rotor ring set relative to the active stator magnetic ring.

17. The magnetic bearing in accordance with claim 16 wherein the magnetic rings of the passive rotor magnetic ring set are graduated in diameter and the magnetic rings of the passive stator magnetic ring set are graduated in diameter complimentary to the rotor magnetic rings.

18. The magnetic bearing in accordance with claim 16 further including:
    non-ferrous, electrically conductive spacers disposed between the magnetic rings of at least one of the stator and rotor magnetic ring sets.

* * * * *